US 6,714,501 B2

(12) United States Patent
Eom

(10) Patent No.: US 6,714,501 B2
(45) Date of Patent: Mar. 30, 2004

(54) CIRCUIT AND METHOD TO PREVENT ERRORS IN RECORDING

(75) Inventor: Woo-sik Eom, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 304 days.

(21) Appl. No.: 09/792,038

(22) Filed: Feb. 26, 2001

(65) Prior Publication Data

US 2001/0024286 A1 Sep. 27, 2001

(30) Foreign Application Priority Data

Feb. 26, 2000 (KR) .......................................... 2000-9623

(51) Int. Cl.[7] ................................................ G11B 7/00
(52) U.S. Cl. ................ 369/53.34; 369/53.37; 369/47.3; 369/47.48
(58) Field of Search ............................ 369/47.28, 47.3, 369/47.48, 53.3, 53.34, 53.37

(56) References Cited

U.S. PATENT DOCUMENTS

| 4,698,695 | A | * | 10/1987 | Kosaka et al. ............... 358/338 |
| 5,495,465 | A | * | 2/1996 | Arisaka ....................... 369/124 |
| 6,181,655 | B1 | * | 1/2001 | Gushima ..................... 369/47.31 |
| 6,198,710 | B1 | * | 3/2001 | Hori et al. ..................... 369/59 |
| 6,201,784 | B1 | * | 3/2001 | Maeda ....................... 369/275.3 |
| 6,266,308 | B1 | * | 7/2001 | Andoh ....................... 369/53.24 |
| 6,292,448 | B1 | * | 9/2001 | Yoshida et al. ............... 369/53.27 |
| 6,320,833 | B1 | * | 11/2001 | Nonaka et al. ............... 369/53.25 |
| 6,345,023 | B1 | * | 2/2002 | Fushimi et al. ............... 369/47.36 |
| 6,442,115 | B1 | * | 8/2002 | Shimoda et al. ............... 369/47.28 |
| 6,496,458 | B2 | * | 12/2002 | Tsukihashi .................. 369/47.47 |
| 6,504,800 | B1 | * | 1/2003 | Kuwahara et al. ............ 369/44.26 |
| 6,564,009 | B2 | * | 5/2003 | Owa et al. .................... 386/126 |

FOREIGN PATENT DOCUMENTS

JP          10-320783          4/1998

* cited by examiner

Primary Examiner—Gautam R. Patel
(74) Attorney, Agent, or Firm—Staas & Halsey LLP

(57) ABSTRACT

A circuit and a method of preventing errors in recording. The circuit includes a first detector to generate a detection pulse by determining whether or not a counted value, which is obtained by counting a cycle of an input wobble signal based on a system clock signal, is in the permissible range of a constant write rate. The circuit further includes a second detector to generate a recording control signal to allow or prohibit a record operation after determining whether the detection pulse meets a predetermined lock condition or a predetermined unlock condition. The circuit prevents errors in recording prevents errors in reproduction data caused by errors in recording, by prohibiting recording if the rotation speed of a disc is not at a desired constant rate in an optical recording and/or reproducing apparatus in which data can be reproduced at a constant or a variable rate and must be recorded at a constant rate. Thus, data can be stably recorded, thereby enhancing recording quality.

3 Claims, 3 Drawing Sheets

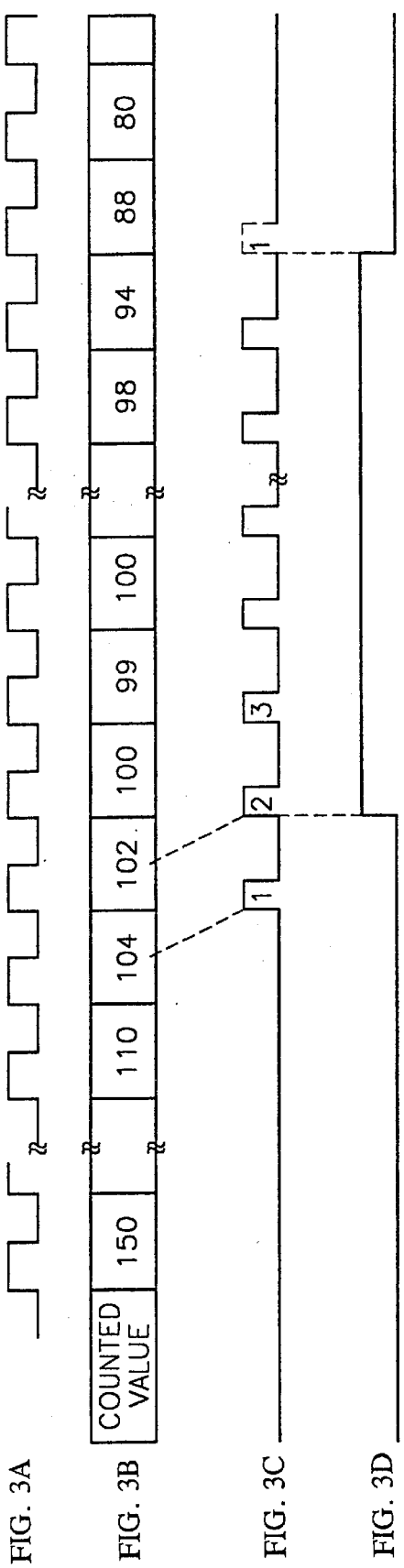

CIRCUIT AND METHOD TO PREVENT ERRORS IN RECORDING

CROSS-REFERENCE TO RELATED APPLICATION

This application claims the benefit of Korean Application No. 00-9623, filed Feb. 26, 2000, in the Korean Patent Office, the disclosure of which is incorporated herein by reference.

BACKGROUND OF THE INVENTION

1. Field of the Invention

The present invention relates to a circuit and a method to prevent errors in recording in an optical recording and/or reproducing apparatus, and more particularly, to a circuit and a method to prevent errors in recording in which recording is prohibited unless a rotation speed or a write rate of a recording medium is constant.

2. Description of the Related Art

For a recording format in a conventional disc such as a compact disc-recordable (CD-R), or a compact disc-rewritable (CD-RW), a constant linear velocity (CLV) method is adopted to extend data storage capacity. For a recording format in a conventional digital versatile disc-random access memory (DVD-RAM), a special zoned constant linear velocity (ZCLV) in which a constant angular velocity (CAV) method is used in a zone, while a CLV method is used between zones. Due to advancements in hardware, most compact disc-read only memories (CD-ROMs) achieve a high speed access by reproduction using a CAV method. In accordance with future developments in technology, it is expected that a DVD-RAM will be reproduced with a CAV method.

When data must be recorded with a constant rate CLV or ZLCV method, data is recorded immediately after the data is reproduced with the CAV method. A quantity of light is not sufficient to record data on the disc because the rotation speed of the disc does not reach a rotation speed of a motor at a constant recording rate. Therefore, the data cannot be recorded smoothly, and a high speed access cannot be achieved. Thus, reproduction of data is subject to errors. Particularly, in a CD-R, or a DVD-R, because of the occurrence of errors, data cannot be recorded, which is a disadvantage of the present design.

Furthermore, when data is recorded from a first area to a second area in a DVD-RAM which must use the ZCLV method, a physical identification (PID) that indicates a physical location on the disc is normally read. However, the rotation speed of the disc does not reach a rotation speed for a constant recording rate, thus the same problem exists regarding an insufficient quantity of light for recording data in the disc, and therefore data cannot be recorded smoothly.

SUMMARY OF THE INVENTION

Accordingly, it is an object of the present invention to provide a circuit to prevent errors in reproducing data caused by errors during recording, by prohibiting recording if a rotation speed of a disc is not at a desired constant rate when the data is recorded in an optical recording and/or reproducing apparatus at a constant rate, and the data is reproduced at a constant or a variable rate It is another object to provide a method of preventing errors in a reproduction signal caused by writing errors during recording, by prohibiting recording if a rotation speed of a disc is not at a desired constant rate when data is recorded in an optical recording and/or reproducing apparatus at a constant rate, and in which the data is reproduced at a constant or a variable rate.

Additional objects and advantages of the invention will be set forth in part in the description which follows, and, in part, will be obvious from the description, or may be learned by practice of the invention.

The foregoing objects of the present invention are achieved by providing a circuit to prevent errors in recording in an optical recording and/or reproducing apparatus in which data is recorded at a constant rate on a recording medium wobbled at a predetermined frequency, and the data is reproduced at a constant or a variable rate from the recording medium. The circuit has a first detector to generate a detection pulse by determining whether or not a counted value is in the permissible range of a constant write rate. The counted value is obtained by counting a number of cycles of an input wobble signal, using as a reference a system clock signal having frequencies higher than the predetermined frequency of the wobble signal. The circuit further comprises a second detector to generate a recording control signal to allow or to prohibit a record operation after determining whether the detection pulse meets a predetermined lock condition or a predetermined unlock condition.

The above objects of the present invention may also be achieved by providing a method of preventing errors in recording in an optical recording and/or reproducing apparatus in which data is recorded at a constant rate on a recording medium wobbled at a predetermined frequency, and the data can be reproduced at a constant or a variable rate from the recording medium. The method comprises generating a detection pulse by determining whether or not a counted value is in the permissible range of a constant write rate. The counted value is obtained by counting a number of cycles of an input wobble signal, using as a reference a system clock signal having frequencies higher than the predetermined frequency of the wobble signal. The method further comprises generating a recording control signal to allow or to prohibit a record operation after determining whether the detection pulse meets a predetermined lock condition or a predetermined unlock condition.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 3A is a waveform diagram of a cycle of wobble signal;

FIG. 3B is a waveform diagram of a counted value of a number of signal clock signals generated by a system clock generator;

FIG. 3C is a waveform diagram of a detection pulse;

FIG. 3D is a waveform diagram of a high and low CLV lock signal.

DESCRIPTION OF THE PREFERRED EMBODIMENTS

Figure 1:
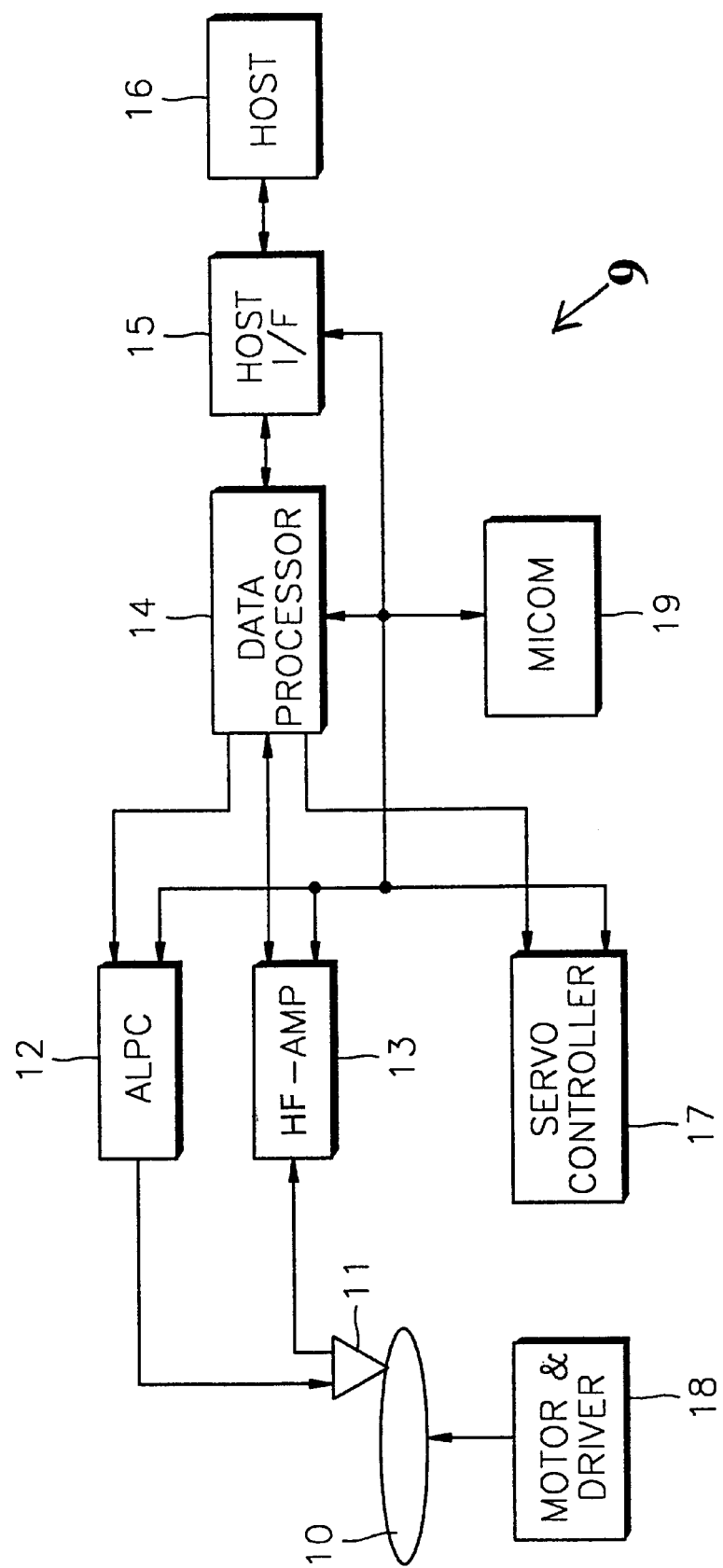
FIG. 1 is a block diagram of an optical recording and/or reproducing apparatus to which the present invention is applied.

Reference will now be made in detail to the present preferred embodiments of the present invention, examples of which are illustrated in the accompanying drawings, wherein like reference numerals refer to like elements throughout.

FIG. 1 is a block diagram of an optical recording and/or reproducing apparatus 9 of the present invention in which data is recorded at a constant rate, and reproduced at a constant rate (for example, data that is recorded with a CLV method is reproduced with a CLV method) or a variable rate (for example, data that is recorded with a CLV method is reproduced with a CAV method). A pickup unit 11 reads a signal recorded on a disc 10. An adaptive laser power controller (ALPC) 12 receives a recording pulse signal and a write clock signal from a data processor 14 (also referred to as a digital signal processor), and controls a quantity of light for recording so that a recording pulse signal is recorded in the form of a recording mark on the disc 10 through the pick-up unit 11 with respect to a write clock signal.

A high frequency amplifier (HF-AMP) 13 amplifies a minute electrical signal output from the pickup unit 11, detects a reproducing signal and a wobble signal from the amplified electrical signal, and then provides the detected signals to the data processor 14. The data processor 14 has a circuit to prevent errors in recording using a wobble signal, according to the present invention. When data is reproduced, the data processor 14 performs a sync signal detection, insertion and protection from the HFAMP 13 performs demodulation, error detection and/or correction, generates various control signals of the HF-AMP 13, and provides a reproducing signal related to a servo (not shown) to a servo controller 17. Also, when data is recorded, the data processor 14 performs modulation and error correction encoding of data provided from a host 16 through a host interface (I/F) 15, generates a record pulse signal corresponding to the processed result, and provides the record pulse signal to the ALPC 12.

The host interface 15 interfaces the data processor 14 and the host 16. The servo controller 17 receives a reproducing signal related to the servo from the data processor 14, and performs motor control related to controlling the rotation speed of the disc 10, and servo control such as tracking, focusing, etc. Motor and driver 18 has a motor related to the rotation of the disc 10, and a driver for the motor. The motor and driver 18 drives the motor according to a motor driving signal and a servo driving signal to track the servo or focus the servo, provided from the servo controller 17. A microcomputer 19 (hereinafter referred to as a "micom") controls each block in FIG. 1. In the present invention, the micom 19 prohibits a recording operation by controlling blocks required to record (for example, ALPC 12, data processor 14, and servo controller 17) when the micom 19 recognizes a recording control signal (hereinafter referred to as a "CLV lock signal@). The CLV lock signal is provided from the circuit to prevent errors in recording in the data processor 14, and indicates that the rotation speed of the disc 10 does not reach a constant recording rate.

Figure 2:
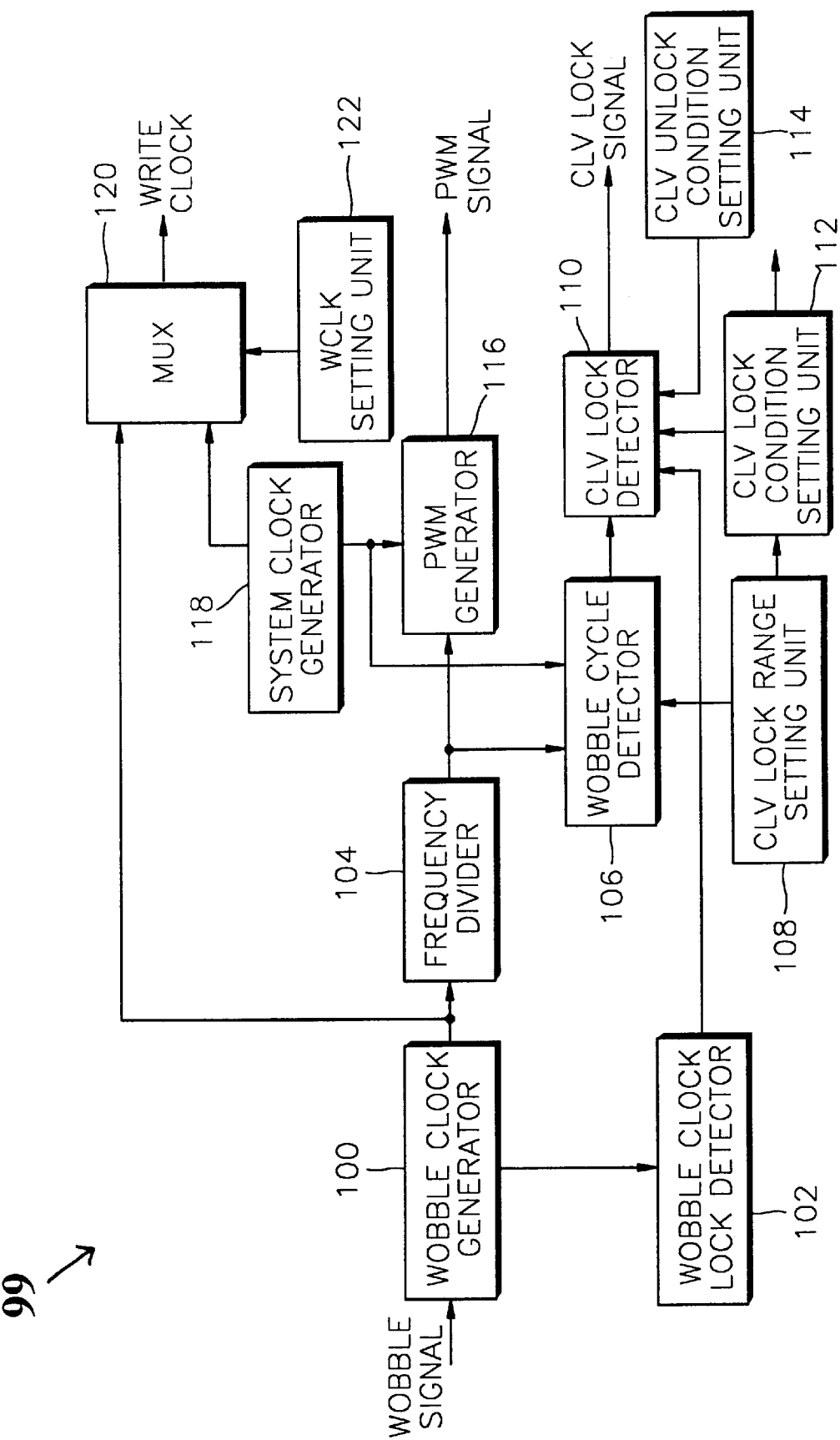
FIG. 2 is a block diagram of an embodiment of a circuit to prevent errors in recording.

FIG. 2 is a block diagram of an embodiment of a circuit 99 to prevent errors in recording. The circuit 99 includes a wobble clock generator 100 to generate a wobble clock signal based upon an input wobble signal; a wobble clock lock detector 102 to determine whether or not the wobble clock generator operates normally; a frequency divider 104 to divide the frequency of the wobble clock signal; a wobble cycle detector 106 to detect the cycle of the wobble clock signal that has passed the frequency divider 104, based on a system clock signal, and to generate a detection pulse; a CLV lock range setting unit 108 to set a variation range of the rotation speed of the motor or a variation range of a write clock, both variation ranges permitted in a recording system; a CLV lock detector 110 to generate a CLV lock signal if the detected pulse that meets a CLV lock range is equal to or greater than a predetermined setting value; a CLV lock condition setting unit 112 to set a CLV lock condition; a CLV unlock condition setting unit 114 to set a CLV unlock condition; a pulse width modulation (PWM) generator 116 to generate a PWM signal to control the speed of the motor for the rotation of a disc; a system clock generator 118, made of crystal to generate a system clock signal; a multiplexer (MUX) 120 to select the wobble clock signal or the system clock signal; and a write clock (WCLK) setting unit 122 to set a wobble clock signal or a system clock signal as a write clock signal. Here, the wobble cycle detector 106 and the CLV lock range setting unit 108 can be referred to as a first detector; the CLV lock detector 110, the CLV lock condition setting unit 112, and the CLV unlock condition setting unit 114 can be referred to as a second detector; the multiplexer 120 can be referred to as a selector; and the CLV lock signal can be referred to as a recording control signal.

Referring to FIGS. 1 and 3A through 3D, the operation of the circuit 99 in FIG. 2 will now be explained. The wobble clock generator 100 comprising a phase locked loop (PLL) circuit multiplies the frequency of the input wobble signal and then provides a phase locked wobble clock signal to the frequency divider 104. The wobble clock lock detector 102 determines whether or not the wobble clock signal generated in the wobble clock generator 100 is locked and then provides the wobble clock lock signal to the CLV lock detector 110.

In general, a wobble pattern having a predetermined frequency is recorded on a groove track and/or a land track, depending on the type of disc. A wobble signal is detected in the HF-AMP 13. The wobble clock lock detector 102 enhances the reliability of the circuit 99 to prevent errors in recording, using the wobble clock signal. The frequency divider 104 divides the frequency of the wobble clock signal generated in the wobble clock generator 100 and outputs a divided wobble clock signal so that the wobble cycle detector 106 can measure the frequency or cycle of the wobble signal, using the system clock signal generated in the system clock generator 118. The wobble cycle detector 106 detects the cycle of the wobble clock signal, shown in FIG. 3A, which was divided by the frequency divider 104, using the system clock signal generated in the system clock generator 118. If the detected wobble cycle meets the CLV lock range set in the CLV lock range setting unit 108, then the wobble cycle detector 106 generates a detection pulse. That is, the wobble cycle detector 106 has an internal counter and counts the number of system clock signals generated in the system clock generator 118 to determine a cycle of the divided wobble clock signal provided by the frequency divider 104. The counted value is shown in FIG. 3B. The CLV lock range setting unit 108 sets a variation range for the rotation speed of the motor or a variation range for a write clock, both variation ranges being allowable in a recording system. That is, since a constant write rate is required when a CLV, or ZCLV method is used, a permissible limit value for a count value idealistically corresponding to the CLV lock (also referred to as a "base value") is set. For example, if one normal cycle of a frequency divided wobble clock signal corresponds to 100 system clock signals generated in the system clock generator 118, and the permissible limit of the CLV lock range set in the CLV lock range setting unit 108 is ±5%, then the CLV lock range is 95–105 clocks.

Therefore, if the number of system clock signals counted in a cycle of the divided wobble clock signal meets the preset CLV lock range, the wobble cycle detector 106 generates a detection pulse, as shown in FIG. 3C, which indicates that a wobble signal meeting the CLV lock range is detected. This detection pulse is generated at the end of one cycle of the frequency divided clock signal.

Depending on conditions set in the CLV lock condition setting unit 112 and the CLV unlock condition setting unit 114, and the wobble clock lock signal that is provided from the wobble clock lock detector 102 to indicate that the wobble clock signal is locked, the CLV lock detector 110 determines whether the detection pulse provided by the wobble cycle detector 106 meets the CLV lock condition or the CLV unlock condition, and provides a CLV lock signal corresponding to the result of the determination to the micom 19. The CLV lock condition setting unit 112 and the CLV unlock condition setting unit 114 can be formed in a unified element to set a CLV lock condition and a CLV unlock condition.

For example, if the CLV lock condition setting unit 112 sets the CLV lock condition to "2" and the CLV unlock condition setting unit 114 sets the CLV unlock condition to "1," the CLV lock detector 110 outputs a "high" CLV lock signal, as shown in FIG. 3D. This is based on the value "2" set in the CLV lock condition setting unit 112 which is set if two consecutive detection pulses meeting the CLV lock range are provided from the wobble cycle detector 106. However, if a detection pulse is not provided from the wobble cycle detector 106 after the CLV lock signal is maintained at "high," then the value "1" set in the CLV unlock condition setting unit 114 is met and the CLV lock detector 110 outputs a "low" CLV lock signal, also shown in FIG. 3D.

The CLV lock signal shown in FIG. 3D is provided to the micom 19 which controls recording operations when the CLV lock signal is "high," and prohibits recording operations when the CLV lock signal is "low."

Meanwhile, by comparing the frequencies of the wobble clock signal frequency divided by the frequency divider 104 and the system clock signal generated in the system clock generator 118, the PWM generator 116 generates a speed control signal (here, a PWM signal) for a constant rate of recording or for a constant or variable rate of reproducing. A PWM signal required to control the rotation speed of the motor in CLV, CAV, or ZCLV, is also provided to the servo controller 17.

The write clock setting unit 122 provides a selection signal, which is used to select between the wobble clock signal and the system clock signal as a write clock signal to be used in recording, to the multiplexer 120. The multiplexer 120 selects between the wobble clock signal and the system clock signal, according to the selection signal provided by the write clock setting unit 122, and provides the selected signal, as the write clock signal to be used in recording, to the adaptive laser power controller 12. Specifically, a signal is selected based on an amount of speed variation of the motor and driver 18. When the amount of speed variation is large, the wobble clock signal is selected. When the amount of speed variation is small, the system clock signal is selected.

Here, the CLV lock range setting unit 108, the CLV lock condition setting unit 112, the CLV unlock condition setting unit 114, and the write clock setting unit 122 can be implemented in registers. While these setting units can be separately designed, as shown in FIG. 2, these setting units can also be embedded in the micom 19. Also, these setting units can be implemented by software.

The present invention can be applied to an optical recording and/or reproducing apparatus, such as a CD-R, CD-RW, DVD-RW, or DVD-RAM, in which data is reproduced at various reproducing speeds and recorded at a constant speed.

As described above, the present invention prevents errors in reproduction data caused by errors in recording, by prohibiting recording if the rotation speed of a disc is not at a desired constant rate in an optical recording and/or reproducing apparatus in which data can be reproduced at a constant or a variable rate and must be recorded at a constant rate. The present invention is advantageous as compared to the conventional design because the present invention allows data to be stably recorded thereby enhancing recording quality.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A circuit to prevent errors in recording in an optical recording and/or reproducing apparatus having a motor wherein data is recorded at a constant rate on a recording medium wobbled according to an input wobble signal having a predetermined frequency and is reproduced at a constant or a variable rate from the recording medium, the circuit comprising:

a first detector to generate a detection pulse by determining whether a counted value, obtained by counting a number of cycles of the input wobble signal, using as a reference a system clock signal having a frequency higher than the predetermined frequency of the input wobble signal, is in a permissible range of a constant write rate;

a second detector to generate a recording control signal to allow or prohibit a record operation after determining whether the detection pulse meets a predetermined lock condition or a predetermined unlock condition;

a system clock generator to generate the system clock signal having the frequency higher than the predetermined frequency;

a generator to generate a speed control signal required to control a rotation speed of the motor, by comparing a frequency of a frequency divided wobble clock signal and the frequency of the system clock signal, so that the rotation speed is at the constant rate to record and at the constant or the variable rate to reproduce;

a selector to select one of the wobble clock signal and the system clock signal and to provide the selected signal as a write clock signal to the adaptive laser power controller;

a wobble clock generator to generate a wobble clock signal using the input wobble signal;

a wobble clock lock detector to determine whether the wobble clock signal is locked and to provide a wobble clock lock signal to the second detector; and a frequency divider to frequency divide the wobble clock signal and to provide the frequency divided signal to the first detector, wherein the optical recording and/or reproducing apparatus comprises:

a high frequency amplifier to detect a reproducing signal and the input wobble signal having the predetermined frequency from a signal picked up from the recording medium by a pickup unit, a data processor to process the reproducing signal provided from the high frequency amplifier in a reproducing time and to process input data to record in a recording time, a servo controller to control the rotation speed of the motor, track servo and focus servo related to the rotation of the recording medium according to the reproducing signal related to the servo among reproducing signals provided from the data processor, an adaptive laser power controller to control a quantity of laser light so that a signal processed to record and provided from the data processor is stably recorded, and a microcomputer to allow or prohibit a recording operation according to the recording control signal, and to set the permissible range of the constant write rate, the predetermined lock condition and the predetermined unlock condition.

2. A circuit to prevent errors in recording in an optical recording and/or reproducing apparatus wherein data is recorded at a constant rate on a recording medium wobbled at a predetermined frequency, and the data is reproduced at a constant or a variable rate from the recording medium, the optical recording and/or reproducing apparatus including a high frequency amplifier to provide a reproducing signal and a wobble signal after picking up a signal recorded on the recording medium through a pickup unit, the circuit comprising:

a wobble clock generator to provide a locked wobble clock signal after locking the wobble signal using a phase locked loop (PLL);

a frequency divider to frequency divide the locked wobble clock signal and to provide a frequency divided wobble clock signal;

a system clock generator to generate a system clock signal having a higher frequency than a frequency of the frequency divided wobble clock signal;

a first setting unit to set a permissible range of a write rate to determine whether a cycle of the wobble signal is in a constant write rate range;

a wobble cycle detector to detect a cycle of the frequency divided wobble clock signal by counting the frequency divided wobble clock signal based on the system clock signal, and if the detected cycle is in the permissible range of the constant write rate, the wobble cycle detector provides a detection pulse;

a second setting unit to set a lock condition that determines a constant write rate is to be locked if the detection pulse meets the permissible range of the write rate more than a first predetermined amount of times, and to set an unlock condition that determines the constant write rate is to be unlocked if the detection pulse fails to meet the permissible range of the constant write rate more than a second amount of predetermined times; and a write rate lock detector to generate the recording control signal to allow or prohibit a recording operation after detecting whether the detection pulse meets the lock condition or the unlock condition.

3. The circuit of claim 2, further comprising:

a wobble clock lock detector to determine whether the wobble clock signal is locked and to provide a wobble clock lock signal to the write rate lock detector;

a generator to generate a speed control signal to control a rotation speed of the recording medium, by comparing the frequencies of the frequency divided wobble clock signal and the system clock signal, so that the rotation speed is at the constant rate to record and is at the constant or a variable rate to reproduce; and a selector to select one of the wobble clock signal and the system clock signal and to provide the selected signal as a write clock signal, wherein the write rate lock detector generates the recording control signal to indicate that the wobble clock lock signal is locked.

* * * * *

UNITED STATES PATENT AND TRADEMARK OFFICE
CERTIFICATE OF CORRECTION

PATENT NO. : 6,714,501 B2
DATED : March 30, 2004
INVENTOR(S) : Woo-sik Eom

It is certified that error appears in the above-identified patent and that said Letters Patent is hereby corrected as shown below:

<u>Title page,</u>
Item [54], change the title to: -- CIRCUIT AND METHOD TO PREVENT ERRORS IN RECORDING USING WOBBLE SIGNAL --.

Signed and Sealed this

Eighth Day of June, 2004

JON W. DUDAS
*Acting Director of the United States Patent and Trademark Office*